United States Patent [19]

Goldsmith

[11] Patent Number: 4,987,915
[45] Date of Patent: Jan. 29, 1991

[54] AUTOMATIC WATER CONTROL APPARATUS

[76] Inventor: Aaron Goldsmith, 23918 Park Grenada, Calabasas, Calif. 91302

[21] Appl. No.: 500,026

[22] Filed: Mar. 27, 1990

Related U.S. Application Data

[63] Continuation of Ser. No. 138,317, Dec. 28, 1987, abandoned.

[51] Int. Cl.$^5$ ............................................. A01G 25/00
[52] U.S. Cl. .................................. 137/78.3; 137/907; 239/63
[58] Field of Search ................. 239/63; 137/78.3, 907, 137/486, 502, 556

[56] References Cited

U.S. PATENT DOCUMENTS

| | | | |
|---|---|---|---|
| 1,963,735 | 6/1934 | Crosthwait, Jr. | 137/502 |
| 2,017,311 | 10/1935 | Jacobsen | 137/502 |
| 2,093,842 | 9/1937 | MacLean et al. | 137/502 |
| 2,777,432 | 1/1957 | Ensign | 137/502 |
| 2,829,664 | 4/1958 | Mountford | 137/502 |
| 2,893,698 | 12/1958 | Richards | 239/63 |
| 3,981,446 | 9/1976 | Hunter | 137/78.3 |
| 4,055,200 | 10/1977 | Lohoft | 239/63 |

Primary Examiner—A. Michael Chambers
Attorney, Agent, or Firm—Lewis Anten

[57] ABSTRACT

A water control apparatus is disclosed which is automatically turned on and off responsive to the moisture content of a moisture sensing element which is placed in the locale where it is desired to control the flow of water, such as in the ground or above a pool or as a humidifer. The device does not require any electical power supply, and uses a venturi device and a ceramic moisture sensing element that is porous to air when dry and impervious to air when wet to control a pressure sensitive valve.

10 Claims, 5 Drawing Sheets

AUTOMATIC WATER CONTROL APPARATUS

This is a continuation of application Ser. No. 07/138,317, filed on Dec. 28, 1987, now abandoned.

BACKGROUND

The present invention relates to apparatus for automatically watering a lawn or agricultural area, humidifying a space such as a room, or adding water to a pool when needed, which turns on to permit the flow of water when a moisture sensing element placed at the location to be supplied with water senses a dry condition There is no requirement for any electrical power supply.

A number of automatic watering and irrigation systems have been devised. The most common of these is used for watering lawns and is set by clocks or timers. Such a device is activated by an electrical solenoid controlled valve, which is activated at predetermined times for set intervals of time. Such systems, however, turn the water supply on even if there is no need for watering, such as when it is raining, and shut off even if the place to be watered has been insufficiently watered. Such systems require a costly electrical timing system and a power supply.

The electrical systems are subject to electrical failures, shorting of the power supply, and damage to the solenoids. Attempts have been made in the prior art to overcome these major disadvantages. The non-electrical systems are unreliable.

In the patent to Beckman, U.S. Pat. No. 4,214,701, a swellable member is clamped around a water supply hose. When wet, the member swells to cut off the flow of water by crimping the hose. However, such action is unreliable, inaccurate and could not be used in place of the existing water sprinkling systems typically found in the home environment.

In the patent to Gibson, U.S. Pat. No. 3,874,590, the swelling of a member, when wet, results in the opening or closing of a switch. The control valve is installed in the ground and requires a complicated arrangement of openings and closings. The presence of the entire device in the ground is undesirable and since it requires physical changes in dimension of an object to operate, the operation of the valve is unreliable.

In U.S. Pat. No. 2,445,717, a ceramic element positioned below a sealed vertical tube filled with water is buried in the soil. A pressure sensitive diaphragm is provided at the top of the tube and operates a valve which controls the irrigation system. When the soil surrounding the ceramic body is dry, the water seeps out into the soil creating a low pressure area in the tube above the water and creates a pressure differential above the diaphragm, thereby turning on the water. When the soil is saturated, the flow of water reverses and the pressure on the diaphragm is once again balanced, closing the valve. This device requires the water in the tube to be periodically replenished and the device must be accessible to the surface for periodic maintenance. The pressure differential created is relatively small and accordingly, the reliability of the device is limited.

In the device shown in the patent to Treirat, U.S. Pat. No. 3,747,399, a pressure differential is created by a wick inserted in the end of the tube. The tube is in contact with the soil, causing moisture to be drawn into the tube, displacing and compressing the air in the tube so as to cause a pressure sensitive switch to operate. Such capillary activated systems are sensitive to clogging, are slow acting and deal in small pressure changes, which are unreliable.

The device of the Richards patent, U.S. Pat. No. 2,863,698, uses the water flow through the capillary pores of a ceramic cell to create a pressure differentiation in the cell to open a valve. The pressure created by the capillary action is small, and slow acting.

In U.S. Pat. No. 3,981,446, a column of water is used to control a valve. The size of the tube is such that the water does not flow out when open to air pressure. The valve is responsive to the pressure changes in the column of water. Once again, small pressure differentials are created.

The device shown in the patent to Parker, U.S. Pat. No. 2,215,132, uses the water flow through an outside household faucet attached to a venturi device to create suction for distributing liquid solutions in the water line. The Parker device is not used as a control for the flow of water through the system, but only to mix the liquid fertilizer with the water in the main water outlet.

OBJECT

It is the object of the present invention to provide a more reliable automatic watering system.

It is another object of the present invention to provide a reliable watering system that does not require electrical power.

It is yet another object of the present invention to provide a watering system that can easily be installed in place of existing automatic water sprinkler systems.

It is another object of the invention to provide an apparatus useful as a humidifier.

It is yet another object of the present invention to provide an automatic watering system that will be activated only when needed.

It is still another object of the present invention to provide an automatic watering system that is more reliable and will not require maintenance for long periods of time.

These and other objects of the invention will be apparent from the accompanying drawings and specifications.

SUMMARY OF THE INVENTION

The present invention provides an automatic water control system whereby the system may be readily used to replace the existing automatic electrically controlled valves presently widely used in the home environment for watering the lawn. It also may be used as an automatic pool filling system and as a humidifier.

A pressure sensitive valve is used to control the main water line valve. A ceramic or plastic element is connected at one end of a first air-impervious tube, which has its other end connected to an airtight chamber on one side of a diaphragm of a pressure sensitive valve. The ceramic or plastic element is inserted in the area of the ground to be watered, or if used to control the level of water in a pool, at the level of water desired to be maintained in the pool, or if as a humidifier, in the room to be maintained at a desirable moisture level. The ceramic or plastic element is porous to air when dry and impervious to air when wet or moist.

A venturi device is located proximate the output of the main water line to the watering system. A first end of a second air-impervious tube is connected at a low pressure point of the venturi device and the second end of the tube is connected to the same airtight chamber as that of the first tube which is connected to the ceramic or plastic element.

Water from the main water line flowing through the venturi device creates a suction at the first end of the second tube which draws the air from the second tube, the air from the chamber above the diaphragm of the pressure sensitive valve in the second tube, and the air from the first tube. When the ceramic or plastic element is dry, air is allowed to pass through the element and into the first tube entering the airtight chamber and out through the second tube. Thus there is a continual supply of air to the chamber and no pressure differential is created in the chamber by the suction of the venturi device. Accordingly, the pressure sensitive valve remains open, in its original position, permitting the flow of water to continue through the main line.

When the ceramic or plastic element is wet, such as from watering, insertion in the pool, or otherwise, it is impervious to air. Accordingly, air cannot enter the first tube through element. Suction from the venturi device draws the air from the first tube, from the airtight chamber and from the second tube. This creates a low pressure area in the chamber above the diaphragm of the valve, causing the valve to close the main water valve in the same manner as by a conventional solenoid controlled valve. A one-way check valve in the line of the second tube prevents air from entering the second tube through the venturi device when the suction from the venturi device stops when the flow of water through the venturi device stops.

When the ceramic or plastic element dries, air is once again permitted to enter the first tube through the element and into the chamber, causing the pressure differential to disappear. The diaphragm, being spring biased, returns to its initial position, once again opening the main valve. The cycle is then repeated.

BRIEF DESCRIPTION OF THE DRAWINGS

Referring to the drawings.

Figure 1:
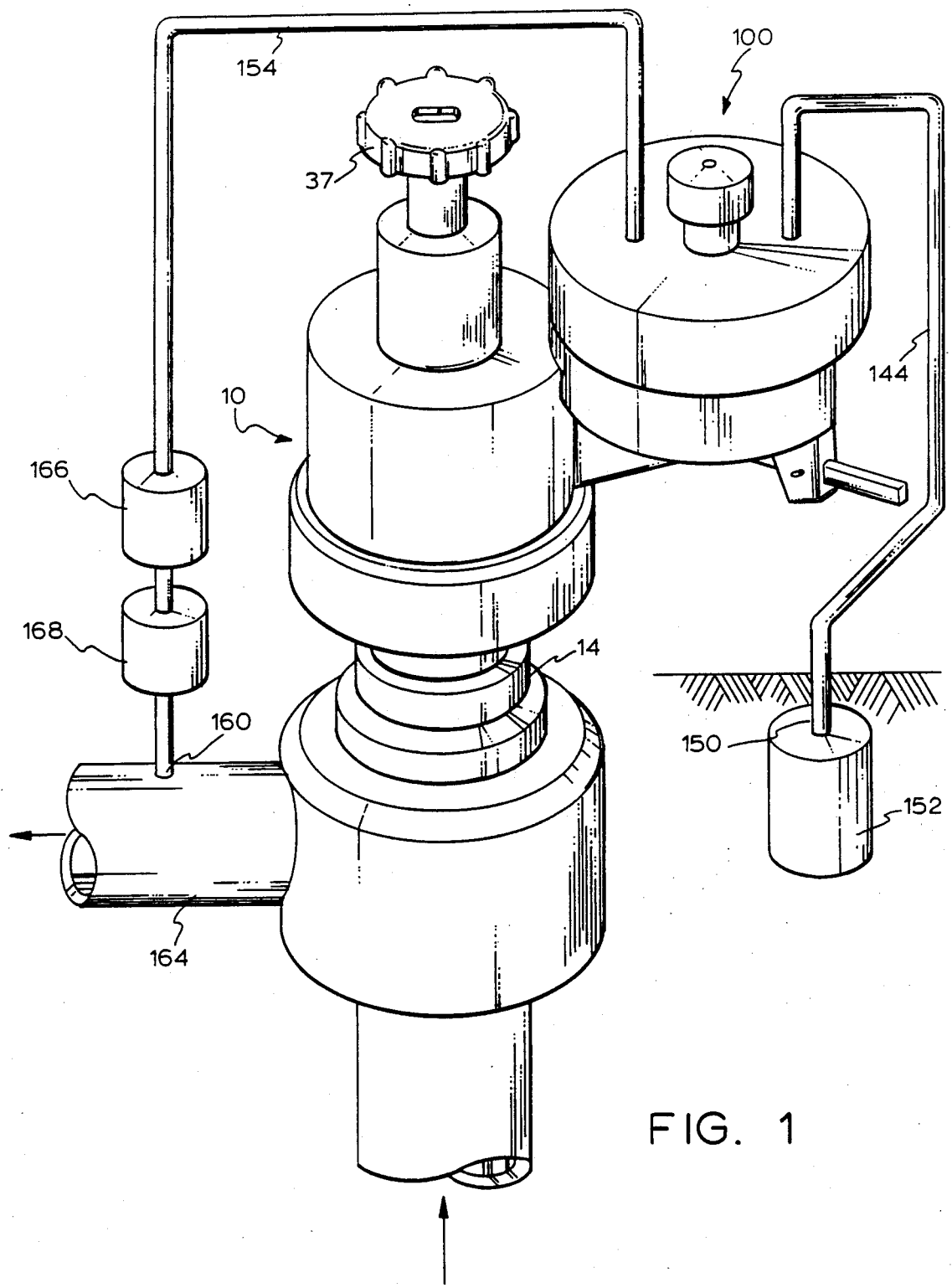
FIG. 1 is a perspective view of the automatic water control device.
Figure 2:
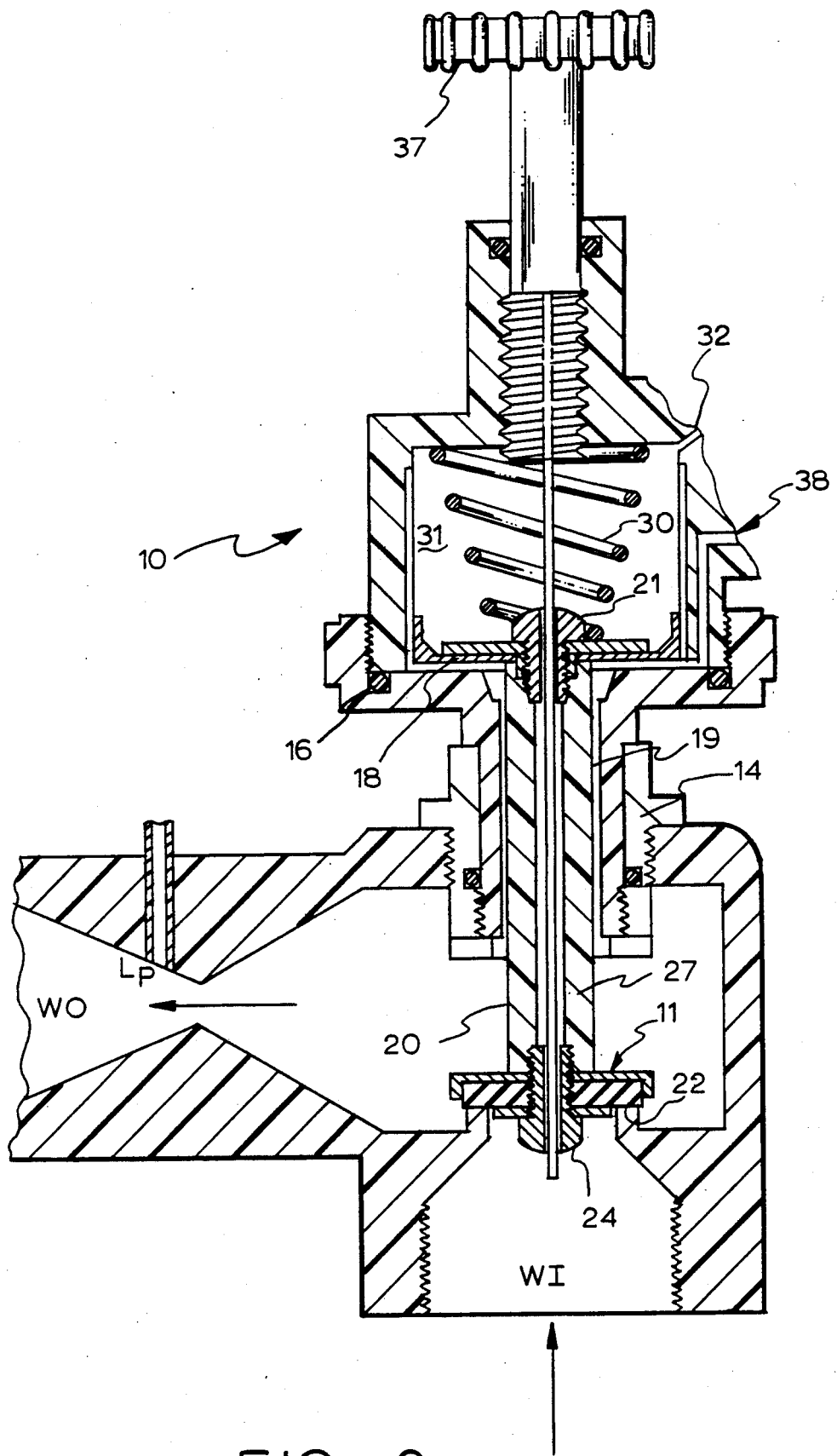
FIG. 2 is a partial sectional side view showing the internal structure of the main valve.

The invention shown in FIGS. 1 and 2 includes a main valve housing 10 and a pressure sensitive valve housing 100. The main valve housing 10 includes a main valve 11, a lower tubular portion 14 which is threaded to the housing and sealed thereto by means of an O-ring 16.

A piston 18 is slidable within the valve housing 10. A valve stem 20 is attached to the piston 18 by means of a screw 21. The valve stem 20 extends through the bottom, thereof.

A usual valve member 22 is mounted to the bottom of the valve stem 20 by means of a screw 24. A bleed port 27 extends longitudinally through the valve stem 20, and through the screws 21 and 24.

A spring 30 within the valve housing biases the piston 18 towards the bottom of the cylindrical chamber 34 defined by the valve housing 10.

The tubular portion 14 is intended to be mounted, for example, in a valve housing of the usual anti-syphon type of valve, and the valve member 22 seats against the valve seat in the housing when the piston 18 is displaced to the bottom of the chamber 34 in the chamber 19. The spring 30, therefore, holds the valve normally in a closed condition.

In addition, water enters the chamber 34 through the bleed port 27 and establishes a hydraulic pressure against the top of piston 18. Due to the fact that the piston area is greater than the area of the valve member 22, the resulting hydraulic action holds the valve in its closed condition.

A pilot port 32 extends at an angle from the upper end of the chamber 34 in the valve housing 10, to the cylindrical pilot valve chamber 36 (FIG. 2A) of the pilot valve assembly 115 at the bottom of the pressure sensitive valve housing 100.

A further passageway 38 is formed from a second cylindrical pilot valve chamber 40 in the pressure sensitive valve housing 100 to chamber 34 in the main valve housing 10 beneath the piston 18. The second cylindrical pilot valve chamber 40 is connected by a passageway 42 to the first cylindrical pilot valve chamber 36.

A pressure sensitive valve 102 is disposed in valve housing 100. The pressure sensitive valve 102 consists of a diaphragm 104 and O-ring seals 106 and 108 fitted within annular cavity 110. The diaphragm 104 divides the valve into an upper pressure sensing chamber 112 and a lower chamber 114. A plunger pin 116 passes through the center of the diaphragm and is fixed to the diaphragm 104 by plates 118 and 120 on either side of the diaphragm 104. The plunger pin extends out of the bottom of the valve housing 100 and through the top of the valve housing 100.

One portion of the plunger pin 116 is connected to a conical plug 122 having its apex 124 of the plug facing the diaphragm 104 and positioned in the second cylindrical pilot valve chamber 40. The other end of the plunger pin 116 is fitted in guide hole 180 to maintain the plunger pin in a vertical orientation and keeps the diaphragm 104 properly positioned. A second conical plug 126 fixed to the plunger pin 116, above the first plug 122, has its apex 128 facing away from the diaphragm 104 positioned in first cylindrical pilot valve chamber 36.

The lower plug 122 is fitted in the cylinder chamber 40 and the upper plug 126 is fitted in the cylinder chamber 40 spaced from one another and of such a size so that the upper plug 126 blocks the top opening in the passageway 42 when the plunger pin 116 is lowered, and the lower plug 122 blocks the lower opening of the passageway 42 when the plunger pin 116 is raised.

A spring 132 is fitted in the pilot valve chamber 36 pressed against the flat portion of the conical plug 126 on one side and by an airtight insert 134 inserted into the top or cylinder chamber 36. An extension 136 of the plunger pin 116 extends below the lower plug 122 through airtight insert 138. The extension 136 is pivotally connected at 137 to lever arm 140 which is pivotally attached to the pressure sensitive valve housing 100 at pivot 142. The lever arm is movable between the distance between the apex 128 and apex 124 of plugs 126 and 122.

A first air impervious tube 144 has its first end 146 passing through an opening 148 into the pressure sensing chamber 112 and its second end 150 connected, in the preferred embodiment, to a ceramic element 152.

A second air impervious tube 154 has its first end 156 passing though a second opening 158 into the pressure sensing chamber 112 and has its second end 160 connected to a low pressure area LP at the output 162 of a venturi device 164 connected to the output of the main valve 11 in the main water line input WI.

In the preferred embodiment, a high resistance ceramic device 166 is inserted in the second tube 154, as is a one-way check valve 168 consisting of a ball element 170 pressed by spring 172 against seat 174. The high resistance device 166 is preferably ceramic and is only slightly pervious to air and may be of any configuration or construction or material that permits only small amounts of air to slowly pass through the device, either by physical structure or by means of a valve configuration.

The pilot valve assembly 115 is normally spring-biased downward by spring 132 so that plug 126 blocks the flow of fluid through the passageway 42, preventing fluid from passing to the lower side of piston 18, thereby maintaining the main valve 11 in a closed position. However, when the diaphragm 104 is lifted, fluid is allowed to pass through the pilot port 42 to chamber 19 opening the main valve 11, and the fluid flows freely.

A quick shutoff control 200 is attached to the pressure sensitive valve housing 100. The quick shutoff control 200 consists of a grouping ring 201 attached to a generally conical-shaped plug 202, having a shaft 203 connected to the apex of the conical-shaped plug 202. The shaft 203 has an enlarged portion 204 at its other end. The shaft 203 and enlarged portion 294 fit within passageway 208 forming an air passageway into the pressure sensing chamber 112. A spring 230 surrounding shaft 203 abutting against a reduced portion 207 in the top of the passageway 208, and the enlarged portion 204 of shaft 203, and normally biases the plug 202 against the opening in the passageway 208.

It will be appreciated that so long as the fluid is prevented from passing to chamber 19, the main valve 11 remains closed. However, when the fluid is allowed into the chamber 19, the main valve 11 will remain open.

The ceramic element 152 is porous and has a pore size of about 12 microns or smaller, so that air can pass through the pores when moisture is not present, but when moisture is present, the pores are blocked, preventing the passage of air.

While a ceramic element is commonly used for these applications, other materials, such as plastic, having a similar pore size could also be used. Ceramic elements are disclosed in the patent to Crane, U.S. Pat. No. 3,758,987.

In the preferred embodiment, the ceramic element 166 has a pore size smaller than 12 microns, preferably in the range of 6-8 microns, so that the flow of air through the pores is somewhat restricted, thereby creating a resistance in the second tube 154.

A description of the operation of the system follows. For ease of understanding, the operation of the device will first be described generally without reference to the quick shut off control 200 and associated apparatus.

Figure 2A:
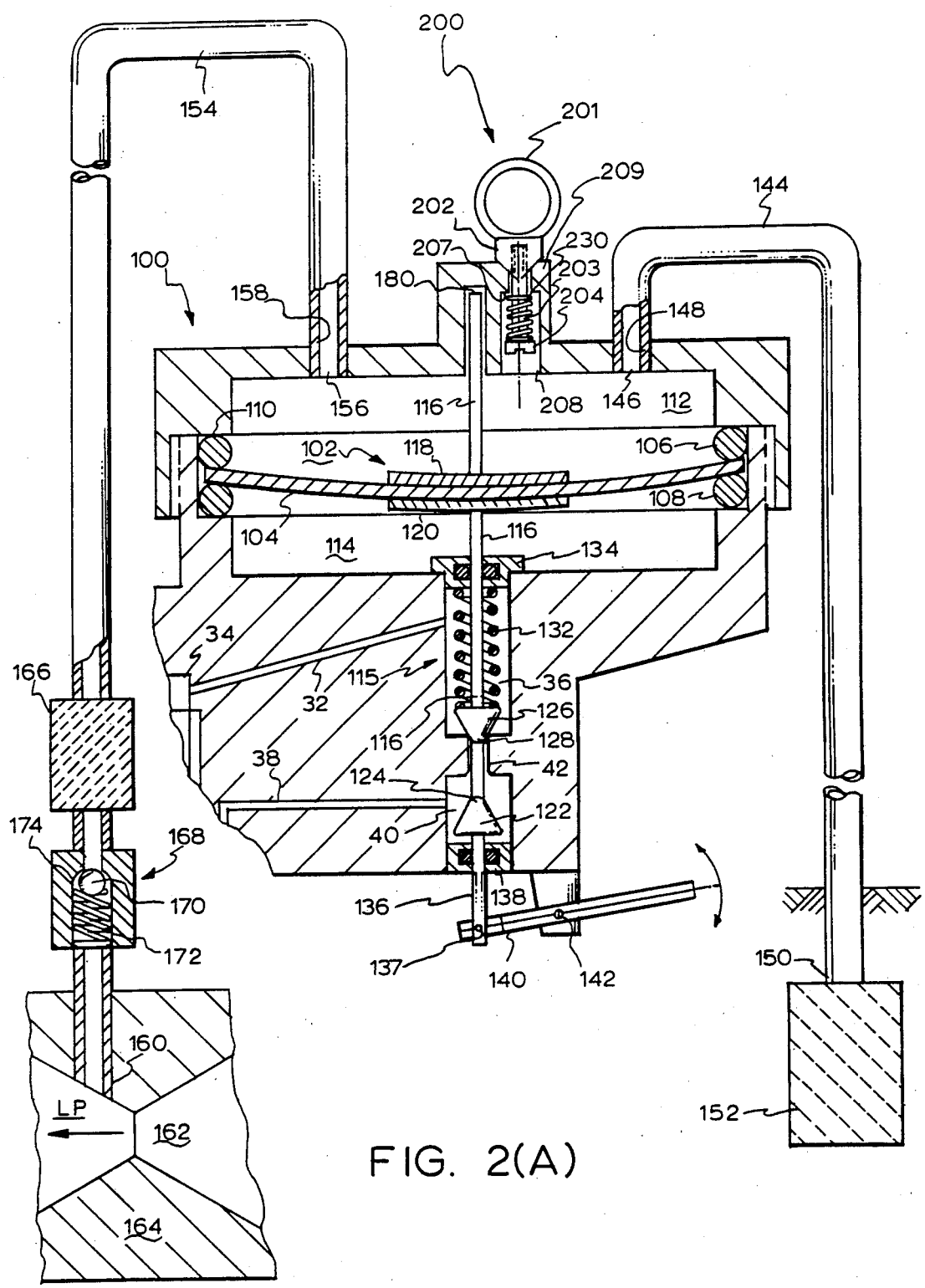
FIG. 2A is a side sectional view of the device of FIG. 1 in the initial locked position.
Figure 2B:
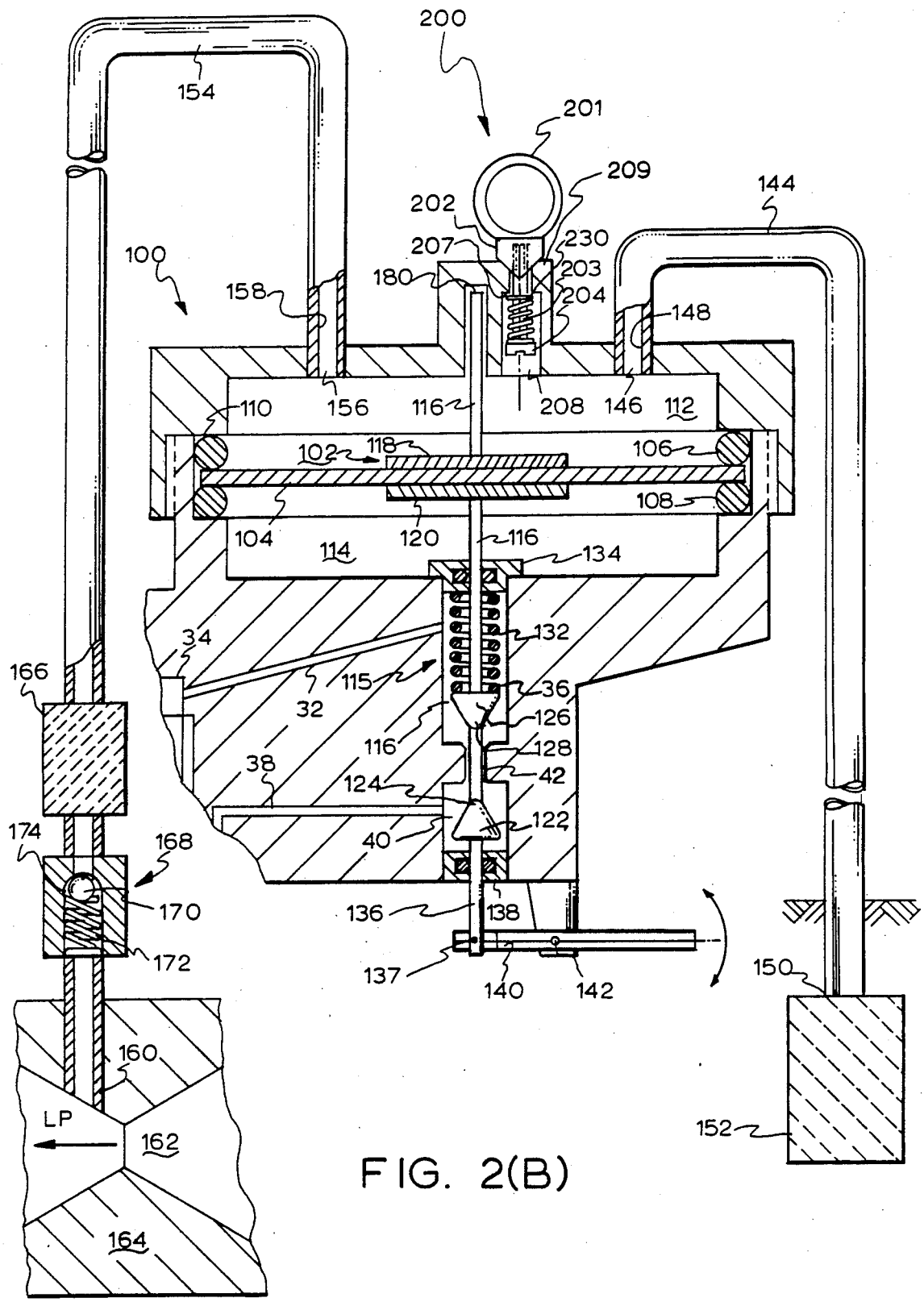
FIG. 2B is a partial side sectional view of the device of FIG. 1, which the valve in an open position.
Figure 2C:
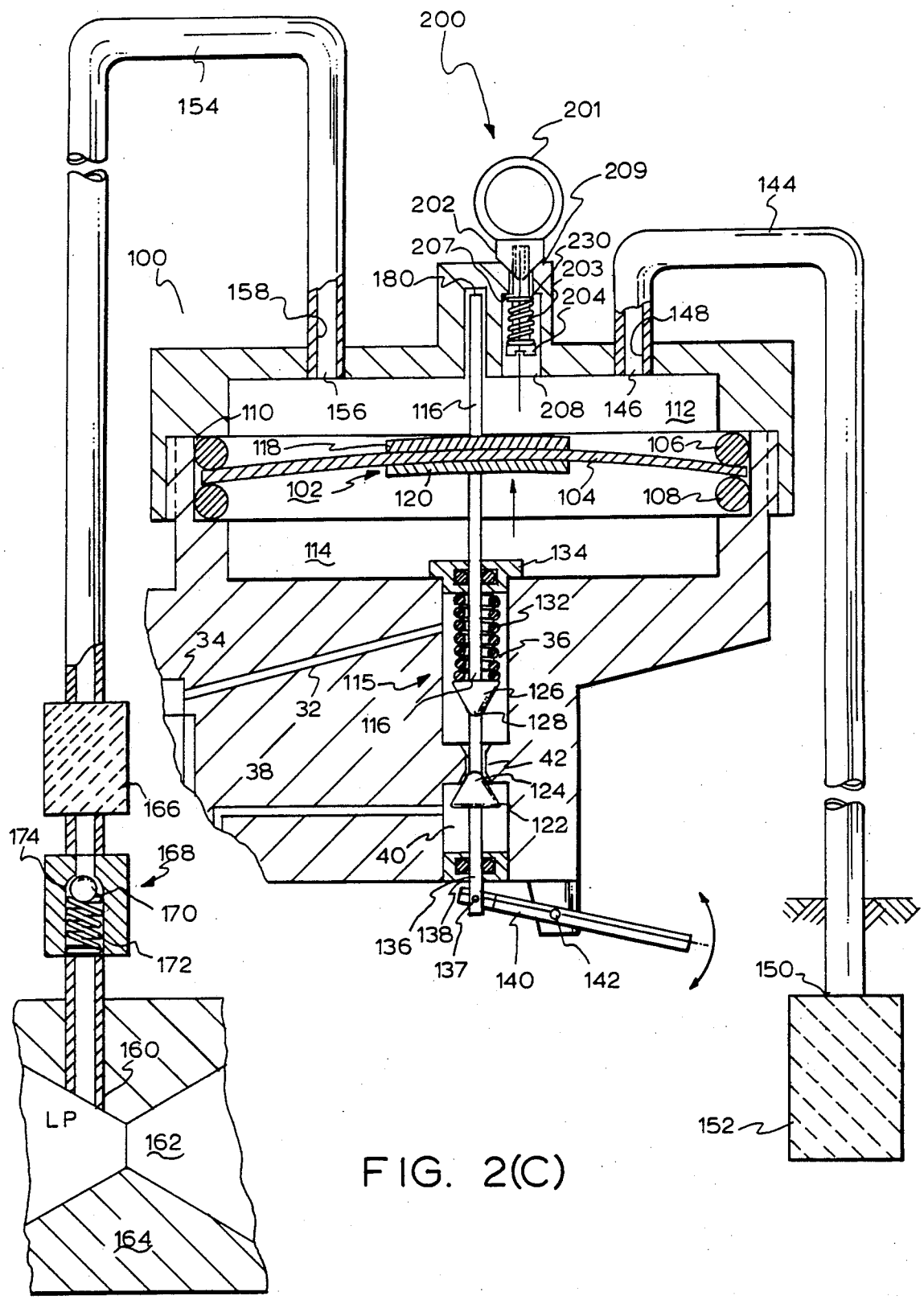
FIG. 2C is a partial side sectional view of the device of FIG. 1, with the valve in a closed position.

Making reference to FIGS. 2B and 2C with the main valve 11 connected at its input WI to a source of water under pressure such as an outdoor faucet and its outlet WO connected to the sprinkler system, the ceramic sensing element 152, which is connected to the chamber 112 by the tube 144, is inserted in the ground in the location to be watered or at the desired water level of the pool.

The main valve 11 is initially in a closed condition so that water is not permitted to pass through the venturi device 164. Assuming that the handle 37 of the main valve 10 is turned so as to have main valve 11 in an open position, the operation is as follows: Lever arm 140 is depressed to the horizontal position, unblocking passage 42 and water is allowed to flow through the system. The water flowing through the venturi device 164 creates a low pressure at LP, creating a suction in the tube 154 drawing at the air contained in the tube 154, the air in the pressure sensing chamber 112 and the air in the tube 144 connected to the ceramic element 152. Since the ceramic element 152 is dry, air is allowed to pass into the ceramic element 152 through the first tube 144 and into the pressure sensing chamber 112. Accordingly, when water is flowing through the venturi device 164 causing suction on the air in the pressure sensing chamber and the air is replenished through the ceramic element 152, the air pressure in the pressure sensing chamber 112 remains at small vacuum pressure and the diaphragm 104 remains at the intermediate position to which it was moved by the initial depressing of lever arm 140. The water continues to flow through the main valve 11, through the venturi device 164 to the main outlet WO and to the sprinkler system or pool watering tube.

When the ceramic element 152 is sufficiently wet from the sprinkling so that the air can no longer flow through the ceramic element 152 and the suction created by the venturi device 164 results in the creation of a low pressure area in the pressure sensing chamber 112 above the diaphragm, causing the diaphragm 104 to move to the upper position as in FIG. 2C back to its intermediate position. The plug 122 blocks the passageway 42 and water ceases to flow to chamber 19, closing the main valve 11.

Thus, a simple, reliable apparatus is disclosed which may be readily be used in existing water sprinkling systems and which does not require maintenance, supervision, or electrical components.

The quick shut off control 200 apparatus is incorporated into the system for the dual purpose of serving as a quick shut off control and also as a safety device, in the event that there is a total opening of the tube 144, such as by accidental cutting by a lawn mower. In the absence of such control, if tube 144 were entirely severed, the lowered air pressure above the diaphragm 104 in the pressure sensing chamber 112 could not be created, even if the ceramic element 152 was wet. The main valve 11 would continue to operate in its open condition, as though the ceramic element 152 were dry. The control valve 200 senses a complete opening to atmospheric pressure and closes the system, shutting off the water as follows.

The quick shutoff control 200 is attached to the pressure sensitive valve housing 100. In order to manually shut off the valve, it is necessary only to pull up ring 201. By opening the air passageway 208 to chamber 112, the pressure in the pressure sensing chamber above the diaphragm will be reduced to atmospheric pressure. This will close the valve by causing spring 132 to push plug 126 downward to close passageway 42.

Under working conditions, the action of the spring 230 and vacuum pressure will maintain the shut off control 200 in a closed position.

It will be appreciated that so long as the fluid is prevented from passing to chamber 19, the main valve 11 remains closed. However, when the fluid is allowed into the chamber 19, the main valve 11 will remain open.

Making reference to FIGS. 2 and 2A, the device is shown in its starting position. The spring 132 biases plug 126 downward so that the plug 126 blocks the top opening to passageway 42. Accordingly, no water can flow to the chamber 19 to open the main valve 11. So long as the plug 126 remains in this position, the main valve 11 will be closed and no water can flow.

Upon slightly depressing the lever arm 140, the plug 126 no longer blocks the passageway 42 (FIG. 2B) and water is now permitted to pass through the passageway 42 to chamber 19 so as to open the main valve 11. Water passing through the venturi device 164 creates suction on the check valve 168 and the tube 154. The suction created by the venturi device 164 is sufficiently strong to still draw sufficient air through the highly resistive element 166 so as to draw out the air in the pressure sensing chamber 112. If the ceramic element 152 is wet, then the suction created by the venturi device is great enough to create a low pressure area above the diaphragm 104 and cause the diaphragm to lift up, pulling the plunger pin 116 and the plug 122 up with it (FIG. 2C). This closes off the passageway 42, causing the main valve 11 to close. The check valve 168 prevents the air from entering the system and destroying the low pressure area.

If the ceramic element 152 is dry, then air is permitted to enter the tube 144 and the pressure sensing chamber 112. There is not enough suction created by the venturi device 164 to cause the diaphragm 104 to stay up. The diaphragm 104 drops and opens passageway 42. This cycle is repeated as the ceramic element dries and then gets wet again.

If the pressure sensing chamber were to be open to the atmosphere, such as by a tube being cut, or ring 201 being lifted, the air pressure in the pressure sensing chamber 112 above the diaphragm would be so great that the suction created by the venturi device 164 would be insufficient to maintain the diaphragm 104 in its intermediate position. This is due to the limitation on the amount of air that can be drawn by the venturi device 164 as a result of the highly resistive element 166. The diaphragm 104 would be drawn down, by spring 132, to its position as shown in FIG. 2A.

The size of the resistive element 166 is such that the amount of air drawn from the pressure sensing chamber 112 is not great enough to overcome the spring tension of spring 132 so as to open the passageway 42 when blocked by the plug 126.

The highly resistive element 166 is in the order of more than ten times impervious to air as that of the resistance to air of the ceramic element 152 when dry. Thus, when the pressure sensing chamber 112 is open to the atmosphere, the low pressure area in the chamber 112 is not sufficient to overcome the spring tension of spring 132. However, when the chamber 112 is able to receive air only through the tube 144 and the ceramic element 152, once the passageway 42 is opened, there is a sufficient low pressure created in the pressure sensing chamber 112 so as to overcome the spring tension of spring 132 in order to prevent the spring 132 from pulling the plunger pin 116 down again.

The water to the main valve 11 can be shut off by turning the handle 37, but for immediate shut off and for situations where the water supply is to be only temporarily shut off, the lever arm 140 can be lifted, blocking passageway 42 as in FIG. 2A, or ring 201 can be lifted, to shut off the water as well.

While the preferred embodiment of the device has been disclosed, it is recognized that other embodiments of the invention may be devised without departing from the scope of the invention. Air resistive configurations other than ceramic may be employed that have different air transmission characteristics when wet from when dry.

What is claimed is:

1. An automatic control for controlling the flow of water through a system comprising:
   (a) a main water control valve means having an open position and a closed position for controlling the flow of water through said main water control valve means, said main water control valve means having an input water connection and an output water connection;
   (b) a moisture sensing valve means having a first normal position and a spring biased second position connected to said main water control valve means for opening and closing said main water control valve means depending on the position of said moisture sensing valve means, said moisture sensing valve means responsive to the flow of air through said moisture sensing valve means;
   (c) a porous moisture sensing means which is porous to air when dry and impervious to air when wet, said porous moisture sensing means connected to said moisture sensing valve means by a first hollow tubing, said porous moisture sensing means controlling the flow of air through said tubing into said moisture sensing valve means;
   (d) a venturi means having a low pressure outlet portion, said venturi means responsive to the flow of water through said water output connection, said low pressure outlet portion of said venturi means connected by a second hollow tubing to said moisture sensing valve means for controlling the position of said moisture sensing valve means whereby when said porous moisture sensing means is impervious to air, the flow of water through said venturi device causes said moisture sensing valve means to change from said first normal position to said spring biased second position and whereby said moisture sensing valve means closes said main water valve means.

2. The apparatus of claim 1, in which said porous moisture sensing element is ceramic.

3. The apparatus of claim 1, in which said second hollow tubing has a one-way valve means for restricting the passage of air in said second hollow tubing to the moisture sensing valve means once said moisture sensing means is closed.

4. The apparatus of claim 3 wherein a porous element resistive to air is positioned in said second hollow tubing between said one-way valve means and said moisture sensing valve means.

5. The apparatus of claim 4 in which said porous element is more resistive to the passage of air than said porous moisture sensing means.

6. The apparatus of claim 4 in which said moisture sensing valve means comprises a diaphragm movable between a neutral position and a first locked position and between said neutral position and a second open position, said diaphragm being spring biased so that it is in the first locked position when the diaphragm is opened to the atmosphere.

7. The apparatus of claim 6 wherein said diaphragm is not movable from said first locked position to said neutral position solely by the action of the venturi device.

8. The apparatus of claim 6 wherein said diaphragm includes and external lever arm connected to said diaphragm for moving said diaphragm to said neutral position.

9. The apparatus of claim 8 including a visual indicating means for indicating when said diaphragm is in said first locked position.

10. The apparatus of claim 6 including a quick shut off means comprising an opening in said moisture sensing valve means, said opening normally closed by a spring biased element movable between an open position and a closed position.

* * * * *